Nov. 4, 1958     H. BLACKSTONE ET AL     2,858,711
MECHANICAL SCAN DRIVE SYSTEM
Filed Dec. 16, 1954
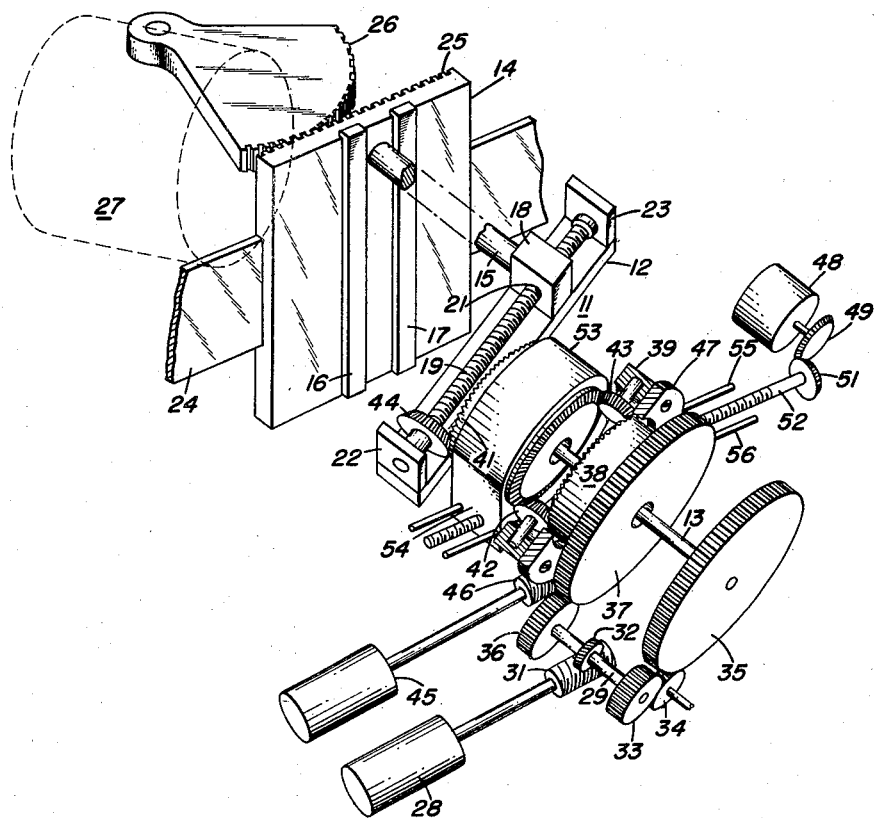
INVENTORS
HENRY BLACKSTONE
JOSEPH T. CONLEY
BY
ATTORNEYS United States Patent Office 2,858,711
Patented Nov. 4, 1958

2,858,711
MECHANICAL SCAN DRIVE SYSTEM

Henry Blackstone, Northport, and Joseph T. Conley, Huntington Station, N. Y., assignors, by mesne assignments, to the United States of America as represented by the Secretary of the Navy Application December 16, 1954, Serial No. 475,853

6 Claims. (Cl. 74—600)

The present invention relates to a mechanical scan drive system for a scanning unit and more particularly to a system for mechanically driving a scanning unit to scan in azimuth, sinusoidally across a given field.

The previously known scan drive systems have been too noisy (electrically) and too inflexible for present day purposes. The present invention overcomes the disadvantages encountered in the prior art systems by the provision of a mechanical means for locking a scanning mechanism onto a target and for selectively narrowing or expanding the field of scan in accordance with varying scanning or tracking requirements. The mechanical arrangement is such that a low degree of electrical noise results and little or no interference is caused with any sensitive element included in the scanning system.

An object of the present invention is to provide a mechanical scan drive system in which a scanning unit can be made to scan in azimuth across a given field of predetermined extent.

An additional object of the present invention is the provision of a mechanical scan drive system for a scanning unit in which the amplitude of scan can be varied while the unit is in operation.

A further object is the provision of a mechanical scan drive system in which the central axis of scan can be selectively shifted so that a scanning unit can be controlled to oscillate about a given relative bearing.

Other objects and many of the attendant advantages of this invention will be readily appreciated as the same becomes better understood by reference to the following detailed description when considered in connection with the accompanying drawings wherein the figure is an exploded schematic view of a scan drive mechanism according to the present invention.

In the construction of the present invention, a scotch yoke drive is utilized to transmit motion to a scanning unit. A crank 11 having an arm 12 and a shaft 13 is positioned contiguous to a scotch yoke slide 14 and is drivingly connected thereto by means of a crank pin 15 slidably disposed between the scotch yoke ways 16 and 17. The crank pin 15 is mounted for controlled movement lengthwise of arm 12 by means of pin block 18 and lead screw 19, block 18 having a transverse internally threaded bore 21 into which the lead screw 19 is threadedly inserted so that as the lead screw is rotated the pin block and the pin are carried lengthwise of the arm 12. The ends of the lead screw are rotatably supported at the extremities of arm 12, such as by being journalled in ears 22 and 23. The scotch yoke slide 14 is mounted on horizontal guide 24 and is driven back and forth thereon by the crank 11 as the rotary motion of the pin 15 is translated into reciprocal horizontal motion of the slide. A toothed rack 25 mounted on the opposite side of slide 14 from ways 16 and 17 meshes with a sector gear 26 which is secured to the scanning unit 27. The scanning unit 27 is mounted in gimbals (not shown) to turn about a vertical axis and is caused to oscillate about this axis by the reciprocal motion of the slide 14 which is transmitted through rack 25 and gear 26 to the unit.

A motor 28 supplies uninterrupted drive to the shaft 13 causing the crank 11 to rotate continuously while the scanning unit is in operation. The motor 28 is drivingly connected, through worm 31 and worm gear 32, to shaft 29 on which are mounted the spur gears 33 and 36. The spur gear 33 meshes with spur gear 34 which in turn meshes with gear 35 secured to shaft 13, and spur gear 36 meshes with gear 37 which is concentric with shaft 13, whereby gears 35 and 37 are driven at the same rate but in opposite directions. Since gear 35 is affixed to shaft 13, the arm 12 and pin 15 rotate therewith, thus causing slide 14 to reciprocate which in turn oscillates unit 27 to scan. The gear 37 is secured to a crown gear 38 which drives through a differential unit 39 to rotate sleeve 41. As the gear 37 rotates, it rotates crown gear 38 in the same direction and at the same rate, this rotation being transmitted to the differential idler gears 42 and 43 which drive the sleeve 41 at the same rate but in the opposite direction to gear 37 and crown gear 38. The sleeve 41, at the end thereof removed from the idler gears 42 and 43, meshes with a bevel gear 44 which is secured to the lead screw 19. Thus, the motor 28 simultaneously rotates arm 12 and sleeve 41 at the same rate and in the same direction so that the sleeve and the bevel gear 44 move together about shaft 13 and there is no relative movement between the lead screw 19 and the arm; therefore, the pin 15 remains in a constant position lengthwise of the arm and the amplitudes of the reciprocation of slide 14 and the oscillation of unit 27 remain constant.

In order to change the position of the pin 15 and thus vary the amplitude of scan of the unit 27, a reversible motor 45 is provided to impart rotation to the differential unit 39. The motor 45 drives the worm 46 which meshes with the teeth on the differential idler case 47. When the motor 45 is idle, the differential gears 42 and 43 merely act as idlers and the sleeve 41 and the bevel gear 44 move together. When the motor 45 is operated, the idler case 47 is rotated at a selected rate and this rate of rotation is transmitted to the differential gears 42 and 43 where it is added to or subtracted from the rate of rotation of crown gear 38, depending upon the direction of rotation of the idler case. The rate of rotation of the sleeve then differs from the rate of rotation of the arm by the amount of the rate of rotation of the idler case, so the sleeve and the bevel gear 44 do not move together at the same rate around shaft 13. When the sleeve and bevel gear 44 move at different rates, the bevel gear is walked around the sleeve and the lead screw 19 is rotated, thus moving the pin block 18 towards or away from the shaft 13, changing the radius of rotation of the pin. The change in radius of rotation of the pin causes a corresponding decrease or increase in the amplitude of scan of unit 27. Thus, the amplitude of scan of the scanning unit can be selectively increased or decreased, at any desired rate by operation of motor 45 in the proper direction at the proper speed for the proper length of time.

An additional control for the unit 27 is provided by motor 48 whereby the central axis of scan of the unit can be selectively pointed so that the unit will oscillate about a given relative bearing. The motor 48 is geared to the lead screw 52 by the bevel gears 49 and 51, the lead screw 52 being threadedly engaged with ear 54 on the cranking mechanism slide 53, whereby rotation of the lead screw 52 by the motor 48 will shift slide 53 on guides 55 and 56. The slide 53 surrounds the sleeve 41 and carries the entire cranking mechanism with it as it is shifted horizontally by the motor 48. As the cranking mechanism is shifted, the pin 15 bears against the ways 16 and 17 moving the slide 14 along the guide 24 and pointing the scanning unit 27 to the desired bearing. The motor 48 is of the reversible type so that the slide 53 can be driven away from or towards the motor 48 and the central axis of scan of the unit 27 thereby pointed to any desired bearing within the limits imposed by its mounting.

The present invention relates only to the disclosed scan drive mechanism and its accompanying controls or adjustments and is not concerned with any particular means for mounting or supporting the mechanism. However, it is clear that the guide 24 and the guides 55 and 56, lead screw 52 and motor 48 should be fixedly mounted while the remaining elements should be mounted for movement in a horizontal plane. A preferred method of supporting the cranking mechanism, including motors 28 and 45, involves mounting the elements thereof on a carriage which may be affixed to the slide 53.

Obviously many modifications and variations of the present invention are possible in the light of the above teachings. It is therefore to be understood that within the scope of the appended claims the invention may be practiced otherwise than as specifically described.

We claim:

1. A mechanical scan drive system for a scanning unit comprising a crank, including an arm and a shaft; a lead screw journalled on said arm; a crank pin threadedly mounted on said lead screw and movable lengthwise of the arm in response to rotation of the lead screw; slidable means operatively connected to the crank pin for translating the rotary motion of the pin into reciprocal horizontal motion, said slidable means being adapted to be drivingly connected to the scanning unit; driving means operatively connected to the crank shaft and to the lead screw for driving said crank and lead screw at the same rate with no relative motion therebetween; control means operatively connected to the lead screw drive for varying the rate of rotation thereof, thus adjusting the radius of rotation of the crank pin and the amplitude of scan of the scanning unit, and means connected to said crank to shift said crank laterally whereby the drive system can be moved laterally.

2. A mechanical scan drive system for a scanning unit comprising a crank, including an arm and a shaft; a lead screw journalled on said arm; a crank pin threadedly mounted on said lead screw and movable lengthwise of the arm in response to rotation of the lead screw; slidable means operatively connected to the crank pin for translating the rotary motion of the pin into reciprocal horizontal motion, said slidable means being adapted to be drivingly connected to the scanning unit; a first motor drivingly connected to said crank shaft, said motor also drivingly connected to said lead screw through a differential unit having an idler case, whereby said crank and said lead screw are driven at the same rate with no relative motion therebetween; a second motor drivingly connected to the differential idler case for selectively rotating same, thus varying the rate of lead screw drive to adjust the crank pin radius and the amplitude of scan of the scanning unit, and means connected to said crank to shift said crank laterally whereby the drive system can be moved laterally.

3. A mechanical scan drive system for a scanning unit comprising a crank, including an arm and a shaft; a lead screw journalled on said arm; a crank pin threadedly mounted on said lead screw and movable lengthwise of said arm in response to rotation of the lead screw; slidable means operatively connected to the crank pin for translating the rotary motion of the pin into reciprocal horizontal motion, said slidable means being adapted to be drivingly connected to the scanning unit; a lead screw drive concentric with the shaft of said crank, said drive including a bevel gear secured to said lead screw, a sleeve gear meshing with said bevel gear, a differential unit having an idler case and being operatively disposed between said sleeve gear and a crown gear; a motor operatively connected to the crank shaft and to said crown gear and continuously driving the crank arm and the lead screw at the same rate with no relative motion therebetween; and a reversible motor operatively connected to the differential idler case whereby the idler case may be held or selectively rotated to vary the rate of lead screw drive, thus adjusting the crank pin radius of rotation and the amplitude of scan of the scanning unit, and means connected to said crank to shift said crank laterally whereby the drive system can be moved laterally.

4. A mechanical scan drive system comprising a crank having a shaft, an arm extending from said shaft, a drive pin mounted for movement along said arm, means to rotate said shaft, means to move said drive pin along said arm while said shaft and pin are rotating about the shaft axis, and means to move laterally said shaft rotating means, crank and associated parts so as to selectively cause said drive pin to rotate about laterally displaced points.

5. A mechanical scan drive system comprising a crank having a shaft and an arm, a drive pin mounted for movement along said arm, a Scotch yoke comprising a guide means and a plate adapted to be reciprocated on said guide means, said crank pin being drivingly engaged with said plate, a rack on said plate, a sector gear meshing with said rack and adapted to be connected to a scan unit, means to rotate said shaft, means to move said drive pin along said arm while said shaft and drive pin are rotating about said shaft axis, whereby to change the amplitude of rotation of said sector gear, and means to move said shaft rotating means, crank and associated parts laterally while said shaft is rotating whereby to vary the central axis of said sector gear.

6. The scan drive system of claim 5, said means for accomplishing lateral movement comprising a housing for said shaft having a threaded bore therein located transversely of the shaft, a screw in said threaded bore fixed against axial movement, and means to rotate said screw.

References Cited in the file of this patent

UNITED STATES PATENTS

| 118,530 | Hamilton | Aug. 29, 1871 |
| 151,949 | Worswick | June 9, 1874 |
| 265,094 | Johnson | Sept. 26, 1882 |
| 1,343,008 | Sauvage | June 8, 1920 |
| 2,319,485 | Alabrune | May 18, 1943 |

FOREIGN PATENTS

| 97,292 | Switzerland | Jan. 2, 1923 |
| 729,098 | Great Britain | May 4, 1955 |

(English language corresponding to French patent cited)

| 1,074,423 | France | Mar. 31, 1954 |